M. A. TAYLOR.
CULINARY UTENSIL.
APPLICATION FILED AUG. 10, 1914.
1,148,129.    Patented July 27, 1915.
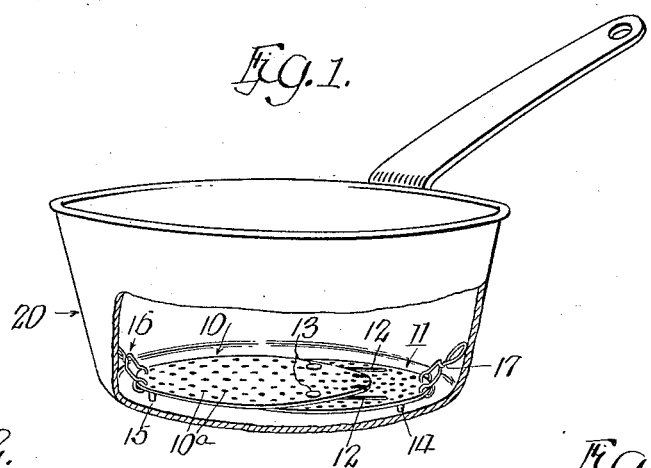
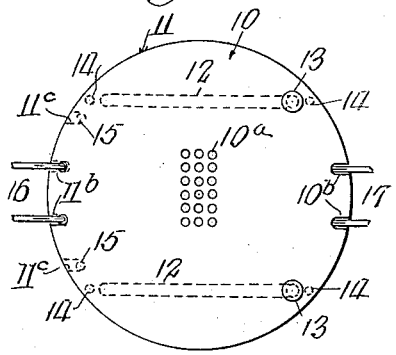
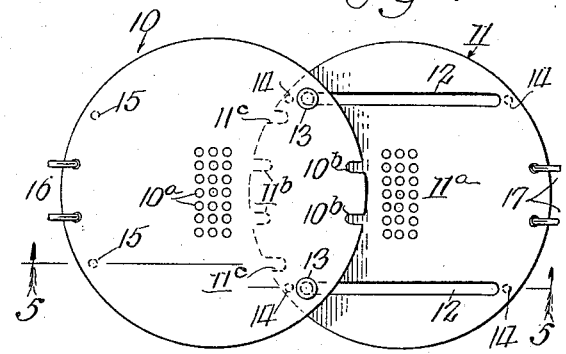
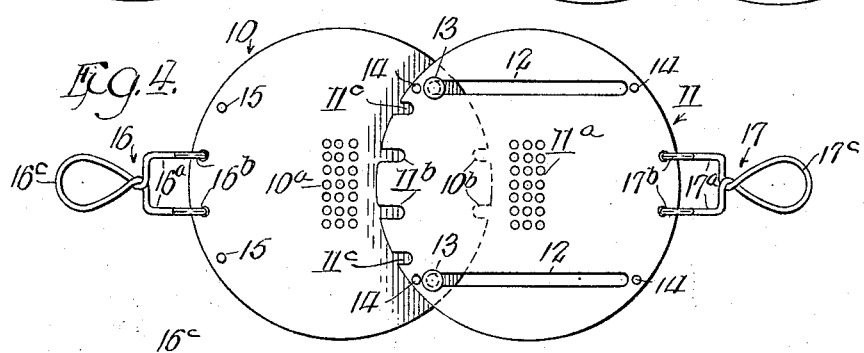

UNITED STATES PATENT OFFICE.

MAMIE A. TAYLOR, OF CHICAGO, ILLINOIS.

CULINARY UTENSIL.

1,148,129.  Specification of Letters Patent.  Patented July 27, 1915.

Application filed August 10, 1914. Serial No. 855,963.

*To all whom it may concern:*

Be it known that I, MAMIE A. TAYLOR, a citizen of the United States, and a resident of Chicago, in the county of Cook and State of Illinois, have invented certain new and useful Improvements in Culinary Utensils; and I do hereby declare that the following is a full, clear, and exact description thereof, reference being had to the accompanying drawings, and to the letters of reference marked thereon, which form a part of this specification.

This invention relates to improvements in culinary utensils and consists of the matters hereinafter described and more particularly pointed out in the appended claims.

The object of the invention is to produce a culinary utensil for use in connection with cooking pots and pans whereby scorching or burning of the article being cooked is obviated.

Another object of the invention is to produce such a utensil as will be applicable to and adjustable for use with pots and pans of different sizes, without the necessity of having the same made up of a number of separable parts.

Still another object of the invention is to produce a cheap and sanitary culinary utensil of few parts, the need of which has been long felt in every kitchen.

In the drawings: Figure 1 is a view in perspective of a cooking pot or pan with a part of the side wall thereof broken away to more clearly illustrate my improved culinary utensil in use in connection therewith. Fig. 2 is a top plan view of my improved culinary utensil, showing the same in its normal position and ready for use in connection with a relatively small sized cooking pot or pan. Fig. 3 is a similar view, illustrating the parts when in extended adjustable position for use in connection with a cooking pan of relatively large size. Fig. 4 is a bottom plan view of the device with the parts in the same position as illustrated in Fig. 3. Fig. 5 is a longitudinal sectional view, the plane of the section being indicated by the line 5—5 of Fig. 3.

In general, my improved culinary utensil comprises a plurality of superposed perforated disks, each of which is provided with suitable supporting legs, said disks being so arranged as to be adjustably extended in a longitudinal direction with relation to each other, so that the device as a whole may be made to accommodate cooking pots and pans of different sizes. Suitable handles are provided so that the utensil as a whole and with it the article being cooked may be removed from its associated cooking vessel.

Referring more in detail to that embodiment of my invention illustrated in the accompanying drawings, 10 and 11 indicate superposed, perforated disks of comparatively thin sheet metal, preferably aluminum. The said disks 10, 11 are each provided with a plurality of perforations $10^a$, $11^a$ and for the sake of clearness, only a few of the said perforations have been illustrated in Figs. 2 to 4, inclusive, although said perforations are provided over the whole area of each disk as is indicated in Fig. 1.

The disk 11 which in this case is the lowermost disk, is provided with two longitudinally extending, parallel slots 12, 12. Said slots extend almost to the peripheral edge of said disk and are spaced apart an equal distance on each side of the center of said disk.

Fixed to the disk 10 near the periphery thereof and spaced apart a distance equal the distance between the slots 12, 12 in the disk 11 are rivet studs 13, 13. There is preferably provided a single stud 13 for each slot 12 and said studs are so arranged that the body $13^a$ thereof extends through each associated slot 12. The projecting end of each rivet 13 is then upset to form a head $13^b$ which engages that part of the disk 11 defining the walls of the slot 12. In this manner, said studs 13, 13 coact with the slots 12, 12 to maintain said disk in proper superposed relation, yet permitting a limited extensible adjustment in a longitudinal direction of one disk relative to the other, in the plane of the slots 12, 12.

14, 14 indicates depending stud members which are rigidly fixed to the disk 11 in line with the slots 12, 12 near the peripheral edge thereof. Said studs constitute legs to support said disk a suitable distance above the bottom wall of the cooking pot or pan in connection with which it is used. The disk 10 is provided with a pair of similar legs 15, 15, said legs acting to support that edge of the disk 10 opposite the rivets 13 when the disks are in their longitudinally extended position.

Each disk 10 and 11 is provided with wire loop handles 16 and 17, said handles comprising forked arms 16ª, 17ª, the ends of which are bent to form eyes 16ᵇ, 17ᵇ each of which project through a pair of the perforations 10ª, 11ª in the respective disks 10 and 11. Each handle is capable of a swinging movement about its point of attachment to its associated disk. The opposite end of said handles are formed to provide loops 16ᶜ, 17ᶜ by means of which the device as a whole may be removed from the cooking utensil in which it is used. When used in connection with a cooking pot of comparatively small size and also to save space when not in use the said disks are adjusted or telescoped so that the peripheral edges of said disks coincide. To accommodate such movement, each of said disks 10 and 11 are notched on that peripheral edge opposite their associated handles 16 and 17, as indicated at 10ᵇ and 11ᵇ, and when said disks are in the position shown in Fig. 3, (wherein their peripheral edges coincide,) the eyes 16ᵇ and 17ᵇ of each handle 16, 17 project into their associated notches 10ᵇ, 11ᵇ. The disk 11 is also provided in its periphery adjacent the notches 11ᵇ with a pair of notches 11ᶜ, 11ᶜ, said notches being arranged in line with and adapted to receive the legs 15, 15 fixed to the disk 10.

The use and operation of my improved culinary utensil is as follows: In Fig. 1, I have illustrated my device as being used in connection with an ordinary cooking vessel 20. In this instance, the said vessel has a bottom wall which is larger in diameter than the diameter of the disks and to accommodate such a condition, I have illustrated the disks 10 and 11 as being in their longitudinal extended position and supported in a plane above the plane of the bottom wall of said vessel by means of their associated legs 14, 15 and with their associated handles 16 and 17 having their looped ends resting against the side walls thereof.

The article to be cooked is placed upon the disk and the desired amount of water added. Generally, the danger of scorching or burning of the article being cooked, lies in the fact that the water has boiled away and evaporated, and should the said article being cooked be resting upon the bottom of the cooking vessel, scorching invariably results. But when the article being cooked is supported in a plane above the bottom wall of the vessel, this cannot happen even though the water has been evaporated.

My improved culinary utensil permits of a free circulation of fluid about the article being cooked, producing a better cooked article, and in the case of meats, etc., obviates the necessity of turning or basting. Another advantage is that the device as a whole with the cooked article upon it may be removed from the cooking vessel.

While in describing my invention I have referred to certain details of construction and arrangement, I do not wish to be limited thereto except as may be pointed out in the appended claims.

I claim as my invention:

1. A culinary utensil comprising two superposed perforated disks, said disks when in one relative position coinciding with each other, one of said disks being provided in its peripheral edge with a plurality of notches and in its body with longitudinally extending parallel slots, stud members fixed to the other of said disks coacting with the slots in the first mentioned disk to maintain said disk in proper superposed relation yet permitting a limited telescopic longitudinal adjustment between them in the plane of said slots, and supporting legs attached to each of said disks, the supporting legs of one disk registering with and being adapted to lie within the notches formed in the peripheral edge of said slotted disk when the peripheries of said disks coincide.

2. A culinary utensil comprising two superposed perforated disks, said disks when in one relative position coinciding with each other, each of said disks being provided with a notched periphery and one of said disks having longitudinally extending parallel slots, means rigidly attached to the other of said disks extending through and coacting with the slots formed in first mentioned disk to maintain said disks in proper superposed relation, yet permitting a telescopic longitudinal adjustment between them in the plane of said slots, supporting legs attached to each disk, handle members swingingly attached to each disk, the legs of one disk and the handles of both disks registering with and being adapted to lie within the notches formed in the peripheral edge of the other disk when the peripheries of said disks coincide.

In testimony, that I, claim the foregoing as my invention I affix my signature in the presence of witnesses, this 3d day of August A. D. 1914.

MAMIE A. TAYLOR.

Witnesses:
T. H. ALFREDS,
M. McCARTHY,
ETHEL A. KRULEWICH.

Copies of this patent may be obtained for five cents each, by addressing the "Commissioner of Patents, Washington, D. C."